United States Patent [19]

Richmond et al.

[11] Patent Number: 5,187,142
[45] Date of Patent: Feb. 16, 1993

[54] CATALYTIC CONVERTER METAL MONOLITH

[75] Inventors: Russell P. Richmond, North Branch; Michael R. Foster, Columbiaville, both of Mich.

[73] Assignee: General Motors Corporation, Detroit, Mich.

[21] Appl. No.: 754,514

[22] Filed: Sep. 3, 1991

[51] Int. Cl.⁵ .................... B01J 32/00; B01J 35/04
[52] U.S. Cl. ................................... 502/439; 502/527; 428/593
[58] Field of Search ................ 502/439, 527; 428/593

[56] References Cited

U.S. PATENT DOCUMENTS

| | | | |
|---|---|---|---|
| 3,183,963 | 5/1965 | Mondt | 165/10 |
| 3,911,675 | 10/1975 | Mondt | 60/283 |
| 3,929,419 | 12/1975 | Chapman | 23/288 |
| 3,962,869 | 6/1976 | Wossner | 60/298 |
| 4,152,302 | 5/1979 | Nonnenmann et al. | 502/527 X |
| 4,324,701 | 4/1982 | Honda et al. | 252/477 |
| 4,382,323 | 5/1983 | Chapman et al. | 29/157 R |
| 4,559,205 | 12/1985 | Hood | 422/180 |
| 4,576,800 | 3/1986 | Retallick | 422/180 |
| 4,619,912 | 10/1986 | Jalbing et al. | 502/439 |
| 4,673,553 | 6/1987 | Retallick | 422/180 |
| 4,731,229 | 3/1988 | Sperandio | 422/188 |
| 4,814,146 | 3/1989 | Brand et al. | 422/179 |
| 4,849,185 | 7/1989 | Wittig | 422/171 |
| 4,942,020 | 7/1990 | Whittenberger et al. | 422/180 |
| 4,987,034 | 1/1991 | Hitachi et al. | 502/527 X |

*Primary Examiner*—W. J. Shine
*Attorney, Agent, or Firm*—Karl F. Barr, Jr.

[57] ABSTRACT

A metal foil substrate catalytic converter for use in the exhaust system of an internal combustion engine, having corrugated metal foil sheets secured together in a stack so that a plurality of axially extending fluid flow paths are defined therebetween. Disposed at predetermined intervals throughout the stack are foil retainer sheets having integral foil tabs extending outwardly from the side edges and folded about the outer side surface of the substrate to form a segmented foil skin thereabout. The segmented foil skin may be welded continuously along its length to secure the foil sheets in a unitary catalyst substrate and to provide a weld surface for attachment of the catalyst substrate directly to the converter canister wall.

4 Claims, 3 Drawing Sheets

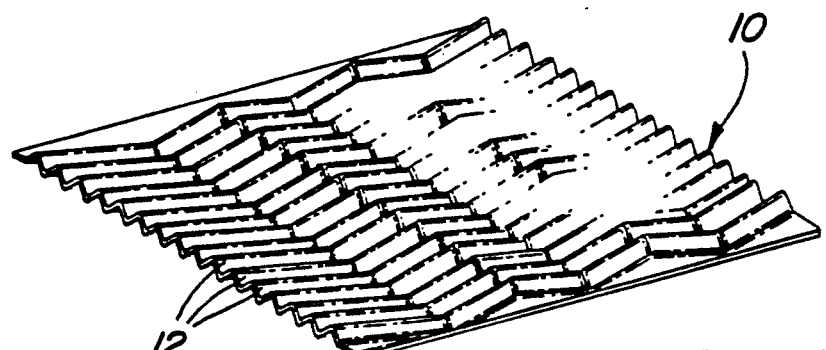
FIG - 1
FIG - 2
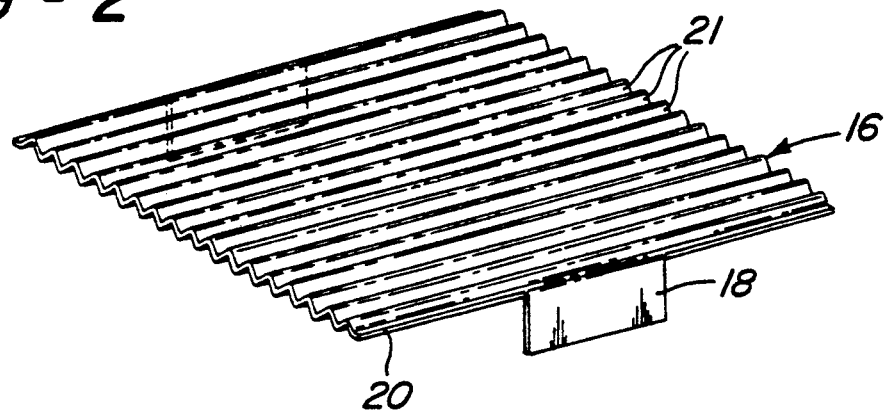
FIG - 3
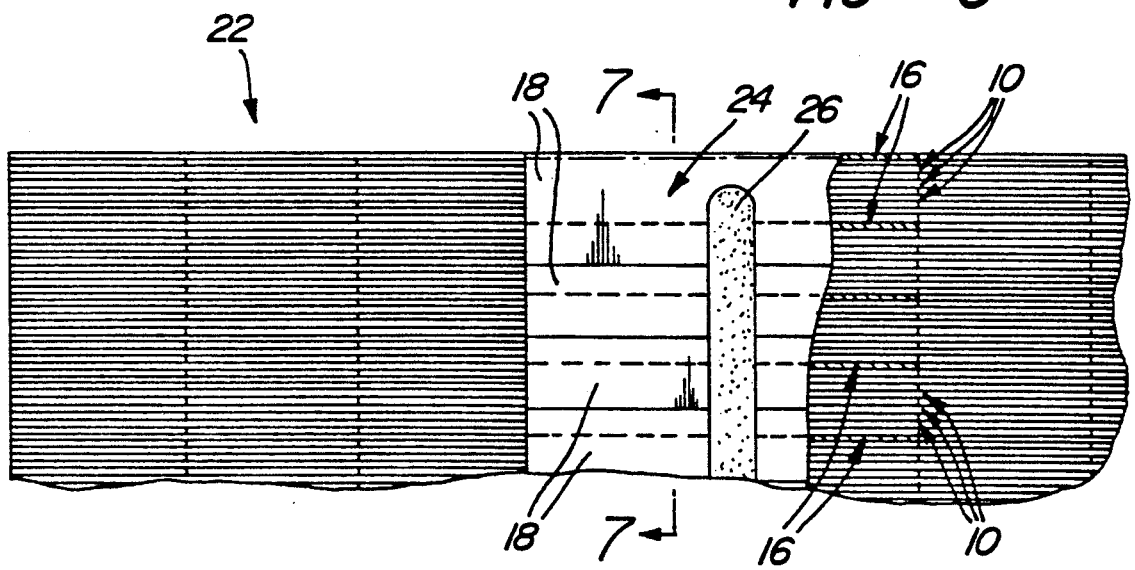

CATALYTIC CONVERTER METAL MONOLITH

BACKGROUND OF THE INVENTION

Field of the Invention

The present application is directed to a catalytic converter for use in the exhaust system of an internal combustion engine and, more particularly, to a metal foil substrate catalytic converter having retaining means integral with the foil sheets of the converter substrate, for mounting the substrate within the converter assembly.

Description of the Relevant Art

Typical automotive vehicle exhaust systems, and an increasing number of non-automotive applications incorporating internal combustion engines, use catalytic converters for reducing the quantity of regulated exhaust constituents emitted therefrom. A common converter configuration consists of a catalyst coated ceramic substrate packaged within a stainless steel canister having openings at each end for the passage of exhaust gas. The ceramic substrate generally is extruded and has axially extending passages or bores through which the exhaust gas passes.

An alternative to the ceramic substrate converter is a metal foil substrate converter. This converter uses a stack of catalyst coated corrugated foil sheets which are fixed together to form a substrate having axially extending passages which may then be mounted in a rigid canister in much the same way as the ceramic substrate. The metal foil converter is durable and is resistant to damage from high temperatures which may occur following an engine malfunction.

Both of the catalyst substrates described above may be mounted within the converter canister using an appropriate insulative or flexible material to separate the substrate therefrom. In the case of the ceramic substrate, a ceramic mat material may be used to protect the substrate from breakage caused by vibration and differing coefficients of thermal expansion between the canister and the substrate. In some cases, the metal monolith utilizes an insulative material to reduce external noise which is generated by contact between the substrate and the canister and to assist in adequately sealing the space between the monolith and the canister wall thereby preventing exhaust gas from bypassing the substrate and reducing canister skin temperature.

SUMMARY OF THE INVENTION

In accordance with the present invention, a metal foil substrate catalytic converter for use in the exhaust system of an internal combustion engine is disclosed. The catalytic converter has a metal foil catalyst substrate comprising corrugated foil sheets secured together in a stack so that a plurality of axially extending fluid flow paths are defined between the sheets. Disposed at predetermined intervals in the stack of corrugated foil sheets are corrugated retainer sheets which have tabs extending outwardly from the side edges. The tabs are folded to contact the sides of the substrate stack. In one embodiment, the tabs overlap one another to form a generally segmented foil skin about the exterior side surface of the substrate stack. The foil skin formed by the overlapping retainer tabs may be welded continuously along its length to the underlying side surface of the substrate stack, thereby aiding in the retention of the stacked foil sheets in a unitary catalyst substrate brick.

The assembled metal foil substrate is coated with a catalyst material and is placed into a rigid canister having an inlet and an outlet for conducting exhaust gas through the converter. The sides of the canister may be welded directly to the foil tabs thereby forming a rigid, unitary converter assembly.

The present invention discloses a metal monolith catalytic converter substrate having integral means for aiding in the retention of the foil sheets which form the substrate into a rigid unit. Additionally, the same integral means may be used to attach the monolith to the converter canister thereby providing a means of mounting the substrate within the converter canister which reduces the need for insulating mats and seals.

Other objects and features of the invention will become apparent by reference to the following description and to the drawings.

BRIEF DESCRIPTION OF THE DRAWINGS

FIG. 1 illustrates a corrugated metal foil sheet used to assemble the catalytic converter of the present invention;

FIG. 2 illustrates a corrugated retainer sheet used to assemble the catalytic converter of the present invention;

FIG. 3 is a partial side view of a metal foil catalyst substrate embodying the present invention;

DESCRIPTION OF THE PREFERRED EMBODIMENTS

Figure 4:
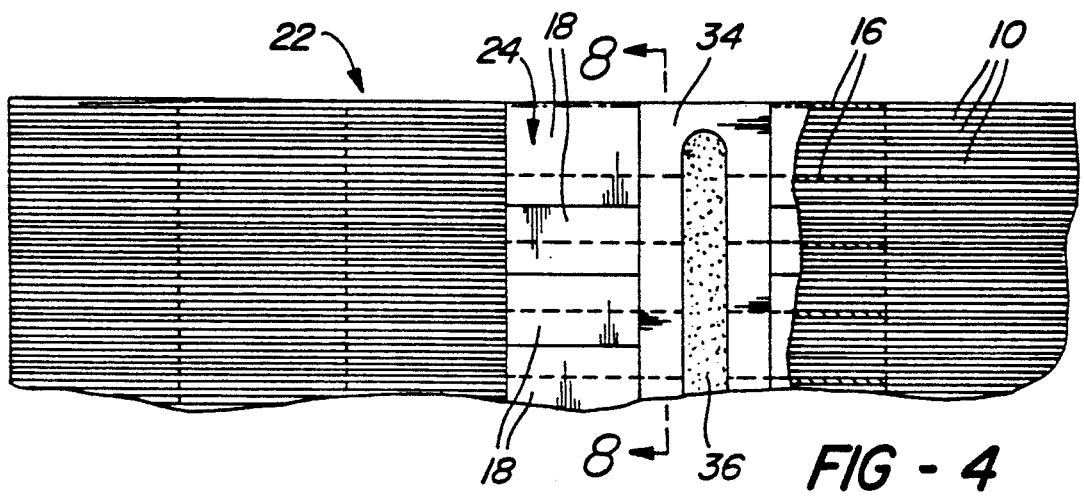
FIG. 4 is a partial side view of a metal foil catalyst substrate showing a second embodiment of the present invention.

In FIG. 1 there is illustrated a corrugated metal foil sheet 10 having a series of corrugations 12 formed thereon. These sheets are of the type described in prior patents, as for example U.S. Pat. No. 3,183,963 and U.S. Pat. No. 4,619,912, such that it is not deemed necessary to describe them in detail herein. The corrugations 12 may be of any desired configuration which will allow multiple sheets to be stacked one upon the other, without the corrugations nesting, to form a series of axially extending fluid flow paths 14, shown in FIGS. 7 and 8. In the preferred embodiment, the corrugations 12 have a herringbone, or alternating chevron pattern.

The corrugated metal foil sheets 10 are stacked together as described above with foil retainer sheets 16, shown in FIG. 2, disposed at predetermined intervals therebetween. The retainer sheets 16 are dimensionally similar to the foils sheets 10 and have tabs 18 which extend outwardly from the side edges 20. The foil retainer sheets 16 may or may not have a corrugated surface. A preferred embodiment for sheet 16 is that shown in FIG. 2 where a straight corrugation 21 extends in the axial direction. The use of the straight corrugation 21 simplifies the manufacturing of the foil sheet by eliminating material stress at the boundary of the corrugations 21 and the tabs 18 which may be caused by the use of a herringbone corrugation such as that used on sheets 10.

Figure 7:
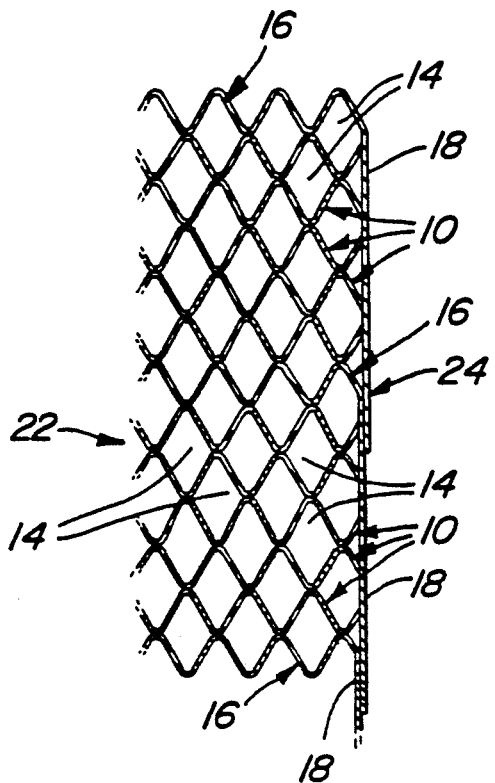
FIG. 7 is a partial section taken along line 7—7 of FIG. 3.

FIG. 3 illustrates a catalyst support substrate 22 constructed from a stack of corrugated metal foil sheets 10 and foil retainer sheets 16, described above. Upon stacking of the sheets, the tabs 18 contact the sides of the substrate 22, as shown in FIG. 7, formed by the edges of the individual sheets 10. In a preferred embodiment, the retainer sheets 16 are spaced to allow overlap of the tabs 18 resulting in the formation of segmented foil skin 24 which extends about a portion of the substrate 22. The skin 24 may be welded along its length to the underlying side surface of the substrate stack, as at 26, to transform the segmented skin 24 into a unitary skin which aids in the retention of the foil sheets 10 and 16 in the desired substrate configuration. Welding of the segmented skin 24 may be used to augment other methods typically used to secure the foil sheets together, such as brazing or capacitive discharge welding which attaches the sheets to one another at their points of contact.

The configuration of the tabs 18 may vary depending on the particular application. It is contemplated that the tabs may extend the entire length of each sheet, resulting in an outer foil skin which extends over the entire side surface of the substrate. It is also contemplated that the retainer sheets 16 are of a thickness greater than that of the foil sheets 10. With such a configuration, tabs 18 may be spaced from one another, rather than overlapping due to interference problems caused by the increase in sheet thickness. The retainer sheets 16 of this design act to structurally augment the converter canister to reduce vibration and noise emitted therefrom.

Figure 5:
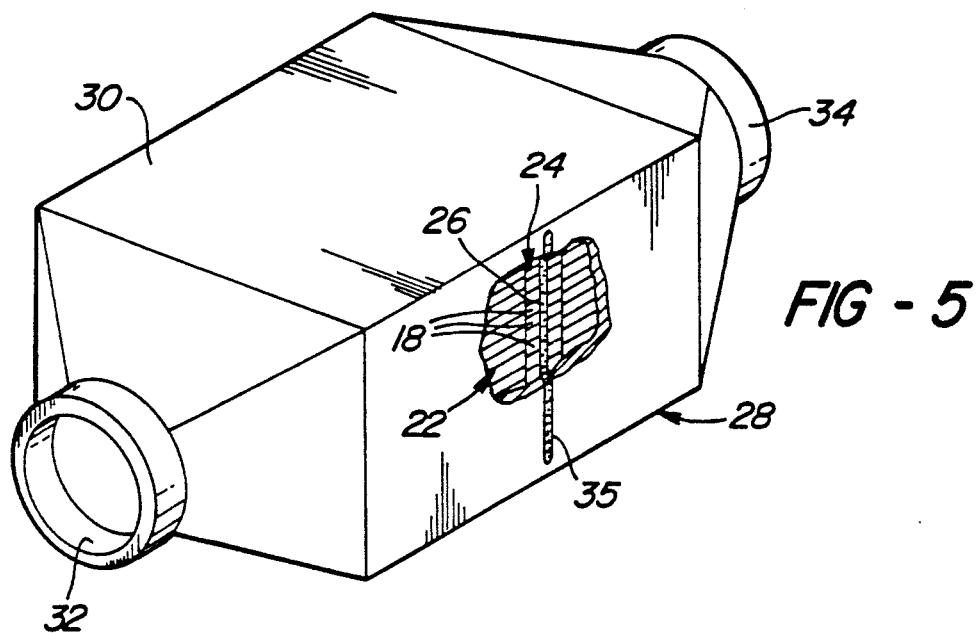
FIG. 5 is a perspective view, partially in section, of a catalytic converter assembly embodying the present invention.

FIG. 5 illustrates an assembled catalytic converter 28 which has been constructed using the substrate 22 disclosed above. The converter assembly 28 comprises a rigid canister 30 which may be constructed of stainless steel or other suitable material. The canister 30 has an inlet 32 and an outlet 34 for conducting exhaust gas through the converter. Integral with inlet 32 and outlet 34 are mounting means, well known in the art, for coupling the converter 28 to the exhaust system (not shown) of an internal combustion engine. The catalyst support 22 described above, having a suitable catalyst applied, is mounted within canister 30 so that exhaust gas entering the converter is conducted through the fluid flow passages 14 where the undesirable constituents of the exhaust gas are reacted prior to their exit therefrom. The substrate is rigidly mounted within the converter by welding the foil skin 24 to the walls of the canister, as at 35. By welding the substrate 22 to the converter canister 30, relative movement between the components is minimized as are problems with noise and destruction of the substrate caused by vibration. Retention of substrate 22 may rely solely on the welded foil tabs 18 or skin 24. Alternatively, this means of retention may be augmented by other types of well known mounting means such as clamping or pinning.

Figure 8:
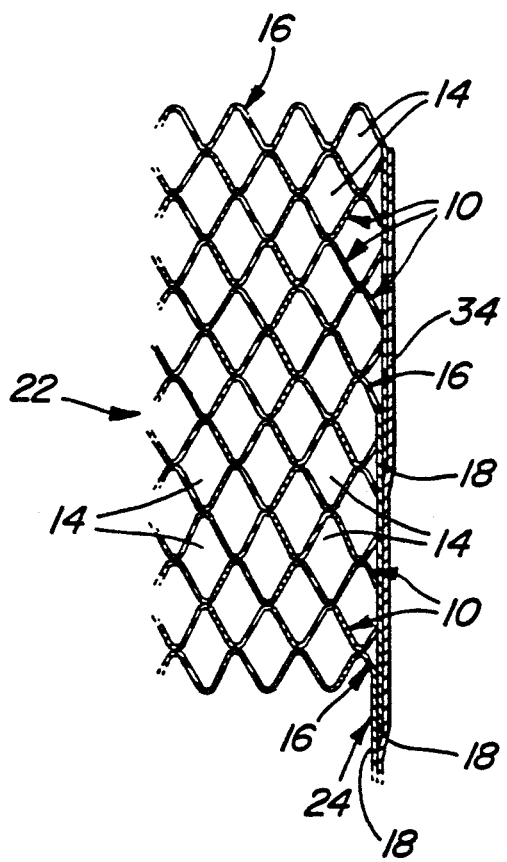
FIG. 8 is a partial section taken along line 8—8 of FIG. 4.

A second embodiment of catalyst substrate 22 is illustrated in FIGS. 4 and 8, where similar features as those described above are denoted by like numerals. To strengthen the weld bonds between both the individual retainer tabs and the stacked foil sheets 10, 16 and also the substrate 22 and the sides of canister 30, substrate support plates or strips 34 are welded to the foil skin 24, as at 36. The support plates 34 contribute to the rigidity of the substrate assembly and provide additional material for welding, thereby contributing to a superior retention of substrate 22 within canister 30. In a similar manner as that described above, the catalyst coated substrate of this embodiment is mounted in the canister 30 by welding the canister walls to the substrate assembly 22 at the locations of the substrate support plates 34. As an alternative to support plate 34, it is contemplated to increase the thickness of the foil retainer sheets 16, as described above, relative to corrugated foil sheets 10 thereby increasing the thickness of tabs 18 and foil skin 24.

Figure 6:
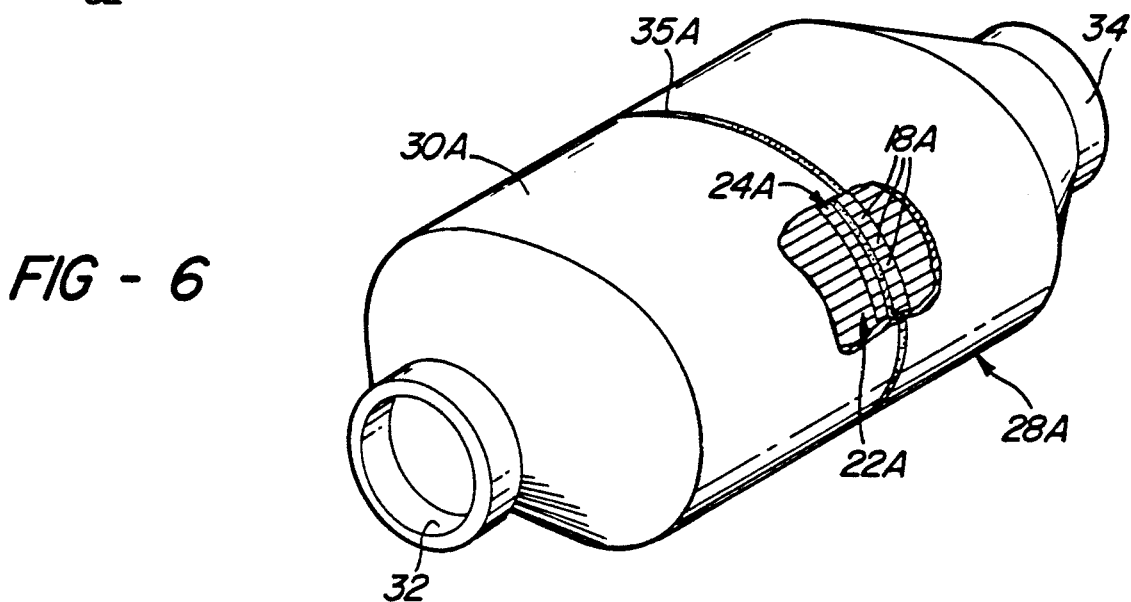
FIG. 6 is a perspective view, partially in section, of a second embodiment of a catalytic converter assembly embodying the present invention.

Although the catalyst support unit 22 described above has been illustrated as a rectangular unit, the scope of the present invention should not be limited to this configuration. It is contemplated that any suitable substrate configuration, such as the standard oval illustrated in FIG. 6 in which similar features as those described above are denoted by like numerals with an "A" suffix, may be constructed using the present invention. In the case of an oval substrate 22A, the segmented foil skin 24A may extend about the entire circumference of the substrate providing a weld surface about the entire unit.

In addition, in each of the above embodiments, it is contemplated to extend the tabs 18, 18A beyond the axial ends of the retainer sheets 16, 16A thereby extending the segmented foil skin 24, 24A beyond the inlet or outlet face of the catalyst support substrate 22, 22A. The resulting extension of the foil skin achieves greater surface area for attachment of the substrate 22, 22A to the walls of canister 30, 30A and defines inlet and outlet cylinders extending about the inlet and outlet faces of the substrate. The cylinders act as integral end cones on the substrate 22, 22A which are flush with the canister sides and channel or direct the exhaust gasses approaching and departing the frontal and end faces through the substrate thereby minimizing the quantity of exhaust which bypasses the substrate 22, 22A at the interface with the canister 30, 30A.

The catalyst support unit of the present invention contributes to a catalytic converter assembly which is simplified in its construction by eliminating the insulation package which is typically required for support of the substrate within the canister. The metal foil substrate incorporates integral retainer tabs within the assembly which may be used for retaining the metal foil sheets as an integral substrate unit and also for mounting the substrate within the canister by providing a weld surface for attachment of the substrate to the canister walls.

While certain embodiments of the invention have been described in detail above in relation to a catalytic converter assembly, it would be apparent to those skilled in the art that the disclosed embodiments may be modified. Therefore, the foregoing description is to be considered exemplary, rather than limiting, and the true scope of the invention is that described in the following claims.

The embodiments of the invention in which an exclusive property or privilege is claimed are defined as follows:

1. A catalyst support substrate for use in a catalytic converter comprising a plurality of corrugated metal foil sheets stacked together to form a plurality of axially extending fluid flow paths therebetween, foil retainer sheets disposed at intervals in said stack of corrugated sheets, said retainer sheets having tabs extending outwardly from the side edges thereof and folded to contact the sides of the substrate stack formed by the edges of said stack of corrugated metal foil sheets to form a segmented foil skin about a portion of said stack, said foil skin welded along its length and forming a unitary skin about said substrate.

2. A catalyst support substrate for use in a catalytic converter, as defined in claim 1, said retainer sheet having a predetermined thickness greater than that of said corrugated foil sheets wherein a desired rigidity is obtained from said foil skin.

3. A catalyst support substrate for use in a catalytic converter, as defined in claim 1, said stack of corrugated metal foil sheets and foil retainer sheets fixed together by capacitive discharge welding at the contact points between said sheets.

4. A catalyst support substrate for use in a catalytic converter comprising a plurality of corrugated metal foil sheets stacked together to form a plurality of axially extending fluid flow paths therebetween, foil retainer sheets disposed at intervals in said stack of corrugated foil sheets, said sheets having retainer tabs extending outwardly from the side edges thereof and folded to contact the sides of the substrate stack formed by the edges of said metal foil sheets to form a segmented foil skin about a portion of said stack, and a substrate supporting plate welded to said segmented foil skin.

* * * * *